United States Patent [19]

Shihabi

[11] Patent Number: 4,621,161
[45] Date of Patent: Nov. 4, 1986

[54] OXYGENATE CONVERSION OVER ACTIVATED ZEOLITE CATALYST

[75] Inventor: David S. Shihabi, Pennington, N.J.

[73] Assignee: Mobil Oil Corporation, New York, N.Y.

[21] Appl. No.: 791,278

[22] Filed: Oct. 25, 1985

Related U.S. Application Data

[63] Continuation-in-part of Ser. No. 573,776, Jan. 23, 1984, Pat. No. 4,559,314, which is a continuation-in-part of Ser. No. 360,749, Mar. 22, 1982, abandoned.

[51] Int. Cl.$^4$ .............................................. C07C 11/20
[52] U.S. Cl. .................................... 585/408; 585/640; 585/733
[58] Field of Search ........................ 585/408, 640, 733

[56] References Cited

U.S. PATENT DOCUMENTS

| | | | |
|---|---|---|---|
| 4,284,529 | 8/1981 | Shihabi | 502/71 |
| 4,312,790 | 1/1982 | Butter et al. | 423/339 |
| 4,325,929 | 4/1982 | Young | 252/455 |
| 4,326,994 | 4/1982 | Haaq et al. | 423/339 |
| 4,344,927 | 8/1982 | Young | 252/455 |
| 4,362,653 | 12/1982 | Robinson | 502/71 |
| 4,443,554 | 4/1984 | Dessau | 502/71 |
| 4,468,475 | 8/1984 | Kuehl | 502/71 |

*Primary Examiner*—Curtis R. Davis
*Attorney, Agent, or Firm*—Alexander J. McKillop; Michael G. Gilman; Dennis P. Santini

[57] ABSTRACT

A process is provided for converting feedstock comprising oxygenates to product comprising hydrocarbons over a catalyst composition prepared by compositing a high silica zeolite having a Constraint Index of from 1 to 12 with binder, followed by treating the composite under conditions effective for increasing the catalytic activity of the composition.

16 Claims, No Drawings

OXYGENATE CONVERSION OVER ACTIVATED ZEOLITE CATALYST

CROSS-REFERENCE TO RELATED APPLICATIONS

This application is a continuation-in-part of application Ser. No. 573,776, filed Jan. 23, 1984, now U.S. Pat. No. 4,559,314, which is a continuation-in-part of application Ser. No. 360,749, filed Mar. 22, 1982, abandoned, the entire contents of each being incorporated herein by reference.

FIELD OF THE INVENTION

This invention relates to catalysis over a catalyst prepared by a method for increasing the catalytic activity of crystalline zeolites by treatment with water. In particular, it relates to conversion of oxygenates, e.g. alcohol, carbonyl or ether, to hydrocarbons over said catalyst.

THE PRIOR ART

Zeolite catalysts have become widely used in the processing of petroleum and in the production of various petrochemicals. Reactions such as cracking, hydrocracking, alkylation, dealkylation, transalkylation, isomerization, polymerization, addition, disproportionation and other acid catalyzed reactions may be performed with the aid of these catalysts. Both natural and synthetic zeolites are known to be active for reactions of these kinds.

Synthetic zeolites containing high proportions of silica relative to alumina have been developed and zeolites of this kind have shown themselves to be useful. U.S. Pat. No. 3,702,886 to Argauer et al discloses a class of crystalline silicates designated ZSM-5 which have highly advantageous properties. U.S. Pat. No. 3,941,871 and its U.S. Pat. No. Re. 29,948 to Dwyer et al disclose crystalline silicates which exhibit a structure, as evidenced by X-ray diffraction pattern, similar to that of ZSM-5 with high ratios of silica relative to alumina. Materials of this kind are stated to exhibit low aging rates and to have low coke making properties when used in hydrocarbon processing.

Various treatments have been proposed in the past for modifying the activity of the zeolites, either by reducing it when too active or by increasing it when insufficient. One such treatment has been steaming and in the past it has generally been used to decrease the activity of the zeolite, as reported in "Fluid Catalytic Cracking with Zeolite Catalysts", Venuto and Habib, Marcel Dekker Inc., N.Y., N.Y. 1979.

The reduction of activity is not, however, necessarily undesirable because it may in certain circumstances be accompanied by an improvement in other characteristics of the zeolite, for example, resistance to aging. This fact has been exploited in certain processes, for example, in the alkylation process described in U.S. Pat. No. 4,016,218, which employs a zeolite catalyst which has been subjected to a prior thermal treatment either in an inert atmosphere or by steaming, to reduce its activity. The deactivation caused by the steam becomes more pronounced at higher temperatures and with longer reaction times.

It has also been found that steaming may in certain instances have beneficial effects upon the catalyst. U.S. Pat. No. 3,257,310, for example, describes a method for preparing a cracking catalyst of high activity and selectivity by steaming a zeolite for at least two hours at a specified temperature. The zeolites described in this patent include natural zeolites such as mordenite and faujasite and synthetic zeolites such as zeolites X, Y and L.

U.S. Pat. Nos. 4,149,960 and 4,150,062 describe the use of water in the feedstock during operation to reduce coking and aging rates. U.S. Pat. No. 3,546,100 describes a method for maintaining the selectivity of a hydrocracking catalyst by restricting the partial pressure of water during the hydrocracking operation.

U.S. Pat. No. 3,493,519 describes a method of producing hydrothermally stable cracking catalysts by calcining zeolite Y in the presence of steam, a process which was theorized to cause lattice aluminum defects which, after subsequent treatment by base exchange with ammonium salts, chelation and calcination in air produced the desired highly active product.

U.S. Pat. No. 3,493,490 describes a method for restoring the activity to used catalyst by controlled treatment with anionic reagents including water at high temperatures, even with catalysts which had initially been steamed to reduce their level of cracking activity, such as zeolites X and Y.

U.S. Pat. No. 3,758,403 describes a method for cracking hydrocarbon feedstocks using a mixture of zeolites including a ZSM-5 type zeolite and a large pore zeolite such as zeolites X, Y or L or faujasite. The selectivity of the catalyst is said to be improved by treatment with steam which, if desired, may be carried out in the cracking unit itself.

A number of U.S. patents teach heteroatom feed conversion. Examples of these are U.S. Pat. Nos. 3,894,104, 3,894,106, 3,894,107, 3,899,544, 3,965,205, 4,046,825, 4,156,698 and 4,311,865. Methanol is converted to gasoline in U.S. Pat. Nos. 4,302,619, 3,928,483 and 4,058,576 as examples. Methanol is converted to olefins and/or aromatics in, for example, U.S. Pat. Nos. 3,911,041, 4,025,571, 4,025,572, 4,025,575 and 4,049,735.

SUMMARY OF THE INVENTION

It has now been found that the degree to which the activity of the zeolites can be enhanced by steaming is increased if the zeolite is steamed in the presence of a binder for the zeolite. The binder preferably used is alumina, either on its own or in the presence of other porous matrix materials. It is believed that the steaming produces additional stable active sites in the zeolite and that these additional sites are responsible for the observed increase in activity.

A novel catalyst composition has been found. This composition comprises an intimate admixture of a high silica crystalline zeolite and an activating metal oxide such as alumina, the composite being treated at elevated temperature in the presence of water to substantially enhance the catalytic activity.

The novel compositions are useful for hydrocarbon conversion.

DESCRIPTION OF PREFERRED EMBODIMENTS

The present invention provides a process for converting a feedstock comprising alcohol, carbonyl, ether or mixtures thereof to conversion product comprising hydrocarbon compounds which comprises contacting said feedstock at conversion conditions with a catalyst composition prepared by a method which comprises forming a composite of crystalline silicate having a high silica to alumina mole ratio, an activating metal oxide comprising alumina and water, and treating the composite under conditions effective for enhancing catalytic activity.

The feedstock to the present process may comprise lower aliphatic alcohols, carbonyls, ethers or mixtures thereof. Feedstock alcohols will be aliphatic alcohols of from 1 to about 6 carbon atoms, preferably from 1 to 3 carbon atoms, e.g., methanol and ethanol. Feedstock carbonyls will be lower aliphatic carbonyls, such as, for example, acetone. Feedstock ethers will be lower aliphatic ethers of up to about 6 carbon atoms, e.g., from 2 to about 6 carbon atoms, such as dimethylether, n-propyl ether, p-dioxane, trioxane and hexose.

The product of this process when alcohols, carbonyls or ethers are converted will be predominantly hydrocarbons including olefins of from 2 to 5 or more carbon atoms with $C_2$ olefins usually less than about 10% of the total and $C_5+$ olefins usually less than about 15% of the total. Aromatic hydrocarbons, such as durene, are also produced. $C_3$ and $C_4$ olefins are desired chemical products, and $C_5+$ products are valuable as gasoline components.

Reaction conditions for the conversion of alcohols, carbonyls, ethers or mixtures thereof to hydrocarbons, e.g., olefins, and hydrocarbons including aromatics, e.g., gasoline components, include a temperature of from about 275° C. to about 600° C., a pressure of from about 0.5 atmosphere to about 50 atmospheres and a liquid hourly space velocity of from about 0.5 $hr^{-1}$ to about 100 $hr^{-1}$.

The zeolites which are used in the present invention have a silica to alumina ratio of at least 100 and may be much higher. It has been found that the degree of enhancement in the activity of the zeolite becomes greater as the silica to alumina ratio of the zeolite increases. Accordingly, the higher silica to alumina ratios above about 250:1 are preferred. If possible, the ratio should exceed 500:1 and we have found that marked enhancement of activity is obtained at ratios over 1200:1, for example, 1600:1. The use of ratios even higher than this is contemplated, going as high as 3200:1 or even higher. The silica to alumina ratio may be determined by conventional analysis. The term ratio as used herein represents, as closely as possible, the ratio in the rigid anionic framework of the zeolite crystal i.e. the structural or framework silica:alumina mole ratio and is intended to exclude materials such as aluminum in binder or in another form within the channels of the zeolite. The ratio may be determined by conventional methods such as ammonia desorption/TGA, or by other ion-exchange techniques. The ammonia desportion/TGA technique is described in a paper by G. T. Kerr, which appears in Thermochimica Acta, Volume 3, (1971), pp. 113–124.

Preferred zeolites may also be characterized by their Constraint Index, which is to be within the approximate range of 1 to 12. The Constraint Index is a measure of the constraint imposed by the crystal structure of the zeolite on the access by molecules of differing sizes to the internal structure of the crystal. A measure of such constraint is desired in order to obtain the desired conversions. It is sometimes possible to judge from a known crystal structure whether constrained access of this kind exists. For example, if the only pore windows in a crystal are formed by 8-membered rings of silicon and aluminum atoms, molecules with a cross-section larger than normal hexane will be excluded and the zeolite is not of the desired type. Zeolite having windows of 10-membered rings are preferred, although, in some instances, excessive puckering or pore blockage may render these zeolites ineffective for certain catalytic conversions. Twelve-membered rings do not generally appear to offer advantageous conversion catalysts, although structures can be conceived, due to pore blockage or other cause, that may be suitable for use in the present invention.

The Constraint Index provides a convenient indication of the extent to which a zeolite provides this restrained access. A method for determining Constraint Index, together with values of the Index for exemplary zeolites, is described in U.S. Pat. No. 4,016,218 and J. Catalysis 67, 218–222 (1981) to which reference is made for details of the method. Because Constraint Index is a characteristic which is dependent upon the structure of the zeolite but is measured by means of a test which is dependent upon the cracking or acid activity of the zeolite, the test candidate should be representative of the zeolite in structure and have adequate cracking activity. Cracking activity may be varied by known artifices such as steaming, base exchange or variation of the silica:alumina ratio.

Zeolites which may be treated by the present activation process include those having the structure of ZSM-5, ZSM-11, ZSM-12, ZSM-23, ZSM-35, ZSM-38 and other similar materials having the appropriate characteristics. ZSM-5 is described in U.S. Pat. No. 3,702,886; ZSM-11 in U.S. Pat. No. 3,709,979; ZSM-12 in U.S. Pat. No. 3,832,449; ZSM-23 in U.S. Pat. No. 4,076,842; ZSM-35 in U.S. Pat. No. 4,016,245 and ZSM-38 in U.S. Pat. No. 4,046,859; said patents incorporated herein by reference. These are preferred zeolites, and of these ZSM-5 is particularly preferred.

Highly siliceous forms of ZSM-5 are described in U.S. Pat. No. Re. 29,948, highly siliceous forms of ZSM-11 in U.S. patent applications Ser. Nos. 003,143, (published as Canadian Pat. No. 1,139,733) and 003,145 (published as Canadian Pat. No. 1,139,732), filed Jan. 15, 1979 and highly siliceous forms of ZSM-12 in U.S. patent applications Ser. Nos. 003,144 (published as Canadian Pat. No. 1,139,731) and 003,146, filed Jan. 15, 1979, said descriptions incorporated herein by reference. All the foregoing applications are now abandoned.

When the zeolites are prepared in the presence of organic cations they are initially catalytically inactive, possibly because the intracrystalline free space is occupied by organic cations from the forming solution. They may be activated by heating in an inert atmosphere at 1000° F. (538° C.) for one hour, for example, followed by base exchange with ammonium salts followed by calcination at 1000° F. (538° C.) in air. The presence of organic cation in the forming solution may not be absolutely essential to the formation of the zeolite but these cations do appear to favor the formation of the desired crystal structure.

Natural zeolites may sometimes be converted to the desired zeolite, i.e. a zeolite having the described silica to alumina ratio by various activation procedures and other treatments such as base exchange, steaming, alumina extraction and calcination. Natural minerals which may be so treated include ferrierite, brewsterite, stilbite, dachiardite, epistilbite, heulandite, and clinoptilolite.

According to a preferred aspect of the present invention, the preferred zeolites have a crystal framework density, in the dry hydrogen form, not substantially below about 1.6 grams per cubic centimeter. The dry density for known structures may be calculated from the number of silicon plus aluminum atoms per 100 cubic Angstroms, as given, e.g., on page 19 of the article on Zeolite Structure by W. M. Meier, including in "Proceedings of the Converence on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal.

Crystal framework densities of some typical zeolites are disclosed in European Patent Application No. 34444, corresponding to U.S. Pat. No. 4,326,994, each incorporated herein by reference.

When it has been synthesized in the alkali metal form, the zeolite may be converted to the hydrogen form, generally by intermediate formation of the ammonium form by ammonium ion exchange and calcination of ammonium form to yield the hydrogen form. In addition to the hydrogen form, other forms of the zeolite wherein the original alkali metal has been reduced to less than about 1.5 percent by weight may be used. Thus, the original alkali metal of the zeolite or introduced hydrogen cations may be replaced by ion exchange with other suitable ions of Groups IB to VIII of the Periodic Table, including, by way of example, nickel, cadmium, copper, zinc, palladium, calcium or rare earth metals.

It is normally preferred to use zeolites of large crystal size, that is, of about 0.1 micron or larger as opposed to small crystal zeolites of about 0.02 to 0.05 micron crystal size because the large crystal zeolites respond better to steaming.

The zeolite, preferably in the as-synthesized form, is composited with an activating metal oxide which is capable of activating the zeolite by the creation of additional active sites when the zeolite/oxide composite is steamed. The oxide will normally act as a binder for the zeolite. The preferred binder is alumina, preferably in the form of alpha-alumina or alpha-alumina monohydrate but other binders may also be used either on their own or in combination with alumina, for example, silica-alumina, silica-zirconia, silica-thoria, silica-berylia, silica-titania as well as ternary compositions such as silica-alumina-thoria, silica-alumina-zirconia, silica-alumina-magnesia or silica-magnesia-zirconia. Other metal oxides which may be employed include titania, zirconia and chromia. Simple experiment may be employed to determine other useful materials.

The relative proportions of zeolite and binder will generally be adjusted in accordance with the silica to alumina ratio of the zeolite, with the zeolites of higher silica to alumina ratio being able to benefit more from a larger proportion of binder than those with a lower ratio. In general, the amount of binder will be from 10 to 90 percent by composite weight of the combined zeolite and binder, preferably 20 to 80 percent by weight. For example, a zeolite with a silica to alumina ratio of about 1600:1 can usefully be composited with 25 to 50 percent by weight of alumina binder.

The zeolite is composited with the binder by intimately mixing the two materials together, in the presence of water, after which the mixture is formed into suitable particles and dried. It has been found that the desired enhancement of activity does not occur if the zeolite and binder are simply mixed dry together instead of being intimately wet mixed as described above. The finely ground mixture of zeolite, binder and water may conveniently be formed into particles by extrusion using an extrusion press or, alternatively, other shaping methods may be used such as pelletizing or pressing. The amount of water is chosen as to give a mixture which has a satisfactory consistency for the forming step. The zeolite may contain sufficient occluded water or sufficient water may be present in the binder.

The zeolite may be treated to convert it to the desired form either before or after it is composited with the binder. Thus, if it is synthesized in the alkali metal form it may be converted to the hydrogen or another cationic form e.g. the alkali metal, alkaline earth metal or ammonium form before or after compositing with the binder. If the conversion entails more than one step the requisite steps may, if desired, be carried out at different stages of the process, some before compositing and some after. Generally, however, the zeolite should be at least partly in the hydrogen form during the steaming or, alternatively, in a form which will be wholly or partly converted to the hydrogen form under the conditions employed during the steaming, e.g. the ammonium form or the alkylammonium form.

After the zeolite/binder composite has been formed it is subjected to steaming. During this step, the composite is held in an atmosphere entirely or partly of steam at an elevated temperature. Generally, it is preferred to operate with an atmosphere of 100% steam although partial steam atmospheres may also be used with some loss of effectiveness. If a gas other than steam is present it should be an inert gas such as nitrogen. The steaming is generally carried out by heating the intimate composite mixture in the presence of water at a temperature from 200° to 500° C., preferably from 300° to 450° C. Good results have been obtained at about 400° to 425° C. The pressure during steaming will normally be atmospheric or superatmospheric pressure, generally in the range of 100 to 500 kPa, preferably from 100 to 200 kPa or more. The steaming should generally be continued for at least one hour and usually durations of 12 to 48 hours will be preferred.

The steam may be produced in-situ, for example, by the dehydration of alcohols such as methanol, ethanol, propanol, n-butanol or pentanol to produce the steam, with olefins as a by-product or by the combustion of hydrocarbons to produce carbon oxides and steam.

The activity of the catalyst is measured in terms of its alpha value. The alpha value reflects the relative activity of the catalyst with respect to a high activity silica-alumina cracking catalyst. To determine the alpha value, n-hexane conversion is determined at a suitable temperature between about 550° F. to 1000° F. (288° to 538° C.), preferably at 1000° F. (538° C.). Conversion is varied by variation in space velocity such that a conversion level of up to about 60 percent of n-hexane is obtained and converted to a rate constant per unit volume of zeolite and compared with that of silica-alumina catalyst which is normalized to a reference activity of 1000° F. (538° C.). The catalytic activity of the catalyst is then expressed as multiple of this standard, i.e. the silica-alumina standard. The silica-alumina reference catalyst contains about 10 weight percent $Al_2O_3$ and the remainder $SiO_2$. This method of determining alpha, modified as described above, is described in the Journal of Catalysis, Vol. VI, pages 278–287, 1966, to which reference is made for further details of the method.

The extent of the activation produced by the present method is notable. Increases of over 100 percent of the alpha value may be obtained with zeolites having a silica to alumina ratio of 1200:1 or more. Commensurate results may be obtained with other zeolites of differing silica to alumina ratio. The enhancement in activity is believed to be caused by the creation of additional, stable active internal sites in the zeolite because after the steaming treatment is completed, the Constraint Index remains consistent with that of the original zeolite strucutre although the alpha value has increased significantly. The catalyst therefore retains its original selectivity but with an improved acid activity.

The following Examples illustrate the improvement of the present invention.

EXAMPLES

EXAMPLE 1

A sample of zeolite ZSM-5 in the hydrogen form and having a structural silica:alumina ratio of 1600:1 is mulled by ball milling with 35 percent by weight of alpha-alumina monohydrate, adding sufficient deionized water to form a mixture which could be conveniently mulled. The mull is extruded into pellets (small cylinders of 1.6 mm diameter) and the pellets air dried at 110° C., precalcined in nitrogen at about 540° C. after which the zeolite is converted to the hydrogen form by ammonium cation exchange, air drying at about 110° C. and calcination in air at about 540° C. The alpha value of this catalyst is increased.

A sample of the catalyst is contacted with 100 percent steam at atmospheric pressure and at a temperature of 425° C. for 18 hours. The steam treated product has an alpha value which is further increased. After the measurement of the alpha value had been made, the catalyst is regenerated by heating in air to 540° C. The alpha value of the regenerated catalyst is not significantly reduced by the regeneration.

EXAMPLE 2

HZSM-5 extrudate was prepared by mulling 1600:1 as-synthesized ZSM-5 with 35% alpha-alumina monohydrate with added deionized water, extruded (1/16 inch), dried at 110° C., precalcined in nitrogen at 538° C., ammonium exchanged, air dried at 110° C. and then calcined in air at 538° C. The alpha value of this catalyst was 7.7.

A sample of this catalyst was contacted with 100% steam at one atmosphere and 800° F. for 18 hours. The steam treated product was found to have an alpha value of 17.6. After alpha measurement the catalyst was air regenerated at 1000° F. Regeneration at 1000° F. gave an alpha value of 17.4. A Constraint Index (C.I.) of 1.6 at 850° F. was obtained for the steamed extrudate. The C.I. value obtained is consistent with conventional ZSM-5 catalysts, indicating that the enhanced activity is due to additional stable sites formed wthin the internal pores of the zeolite.

EXAMPLE 3

A sample of the binder-free 1600:1 zeolite ZSM-5 used in Example 2 was obtained in the hydrogen form by ammonium exchange of the air calcined as-synthesized zeolite, followed by air calcination of the ammonium ZSM-5 at about 540° C. The binder-free zeolite was then treated in 100% steam at atmospheric pressure at 425° C. for varying periods of time, after which the activity of the catalyst was determined. The results are shown in Table I below.

TABLE I

| Steaming Time (Hours) | Alpha Activity |
|---|---|
| 0 | 6.1 |
| 6 | 7.2 |
| 18 | 7.6 |
| 45 | 7.2 |
| 94 | 7.0 |

These results, in comparison with those of Example 2, show that the presence of the binder is necessary for the activation to occur.

EXAMPLE 4

Two parts of the binder-free 1600:1 zeolite ZSM-5 used in Example 2 in the hydrogen form produced by the air calcination of the ammonium form zeolite were mixed well with one part of alpha-alumina monohydrate and the mixture was then pelletized and steamed for 18 hours in 100% steam at atmospheric pressure at 425° C. The alpha value of the steamed catalyst was 6.7, showing that mere admixture of the zeolite and the binder is insufficient for activation.

EXAMPLE 5

The 1600:1 zeolite ZSM-5 of the preceding Examples in the ammonium form was mulled with 35% alpha-alumina monohydrate by ball milling after which the mixture was extruded into 1.6 mm cylindrical pellets. The extruded catalyst was then dried in air at 120° C., precalcined in nitrogen at 540° C., followed by an ammonium exchange, air drying at 120° C., air calcination and steaming for 18 hours at 425° C. under atmospheric pressure. The alpha value of the steamed catalyst was 12.3, a substantial increase over the original alpha value of 6.1.

The catalyst was then steamed for an additional hour at 540° C. and under atmospheric pressure, after which the alpha value was found to be 12.1, consistent with a theoretical prediction of 12.0.

EXAMPLE 6

ZSM-5 having a silica to alumina ratio of 70:1 and in the as-synthesized form was mulled with 35 wt. % alpha-alumina monohydrate and extruded. The extrudate was calcined and ammonium exchanged.

A retained portion of a similarly prepared batch of 70:1 crystals was calcined, ammonium exchanged and the Bronsted acid site content was found to be 0.47 MEQ H/gm, i.e. 0.47 milliequivalents of hydrogen per gram of zeolite. The Bronsted acidity of the extrudate was also found to be 0.47 MEQ H/gm zeolite. The 70:1 ammonium extrudate is identified below as Extrudate 1.

The Bronsted acidity of retained portions of the 1600:1 binder-free ammonium form of ZSM-5 from Example 5, and of the 1600:1 ammonium form extrudate (Extrudate 2) from the same example were also determined. The binder-free sample was found to have 0.02 MEQ H/gm zeolite, and Extrudate 2, 0.057 MEQ H/gm zeolite.

All of the above determinations of acidity were made by TGA titration.

EXAMPLE 7

Extrudate 1 and Extrudate 2 from Example 6 were calcined in 20% air mixed with 80% nitrogen at a high flow rate to convert the extrudates to the hydrogen form. Each was then steamed at 800° F. in 1 atm. steam for 14.5 hours, after which alpha values and acid site densities were evaluated. The results are shown in Table II.

TABLE II

| | Alpha Value | Bronsted Acidity (MEQ H/gm zeolite) |
|---|---|---|
| Untreated Extrudate 1 | 254 | 0.47 |
| Hydrothermally-treated Extrudate 1 | 151 | 0.33 |
| Untreated Extrudate 2 | 7.7 (estimated) | .057 |
| Hydrothermally-treated Extrudate 2 | 15 | 0.13 |

EXAMPLE 8

To demonstrate the present process, a 2 gram sample of product catalyst from Example 5 is placed in a reactor vessel and contacted with feedstock comprised of methanol at a liquid hourly space velocity maintained at 1 $hr^{-1}$, a pressure of 1 atmosphere and a temperature of 370° C. Conversion of the methanol to hydrocarbons is measured to be about 93%. Analysis of the product hydrocarbons from this experiment is presented in Table III, hereinafter, values approximate.

EXAMPLE 9

The experiment of Example 8 is repeated except with the reaction temperature increased to 500° C. Here, approximately 99% of the methanol is converted to hydrocarbons. Analysis of the product hydrocarbons from this experiment is presented to Table III, values approximate.

TABLE III

| Example | 8 | 9 |
|---|---|---|
| Product Hydrocarbons, wt. % | | |
| $C_1$ | 0.8 | 4.9 |
| $C_2$ | 0.1 | 0.6 |
| $C_2=$ | 10.9 | 9.8 |
| $C_3$ | 1.4 | 2.4 |
| $C_3=$ | 16.7 | 37.3 |
| $iC_4$ | 5.7 | 2.3 |
| $nC_4$ | 0.4 | 0.7 |
| $C_4=$ | 11.5 | 18.5 |
| $iC_5$ | 5.4 | 3.3 |
| $nC_5$ | 0.2 | 0.4 |
| $C_5=$ | 5.8 | 6.4 |
| $C_6^+$ non-aromatics | 28.0 | 5.7 |
| $C_6$ aromatics | — | 0.1 |
| $C_7$ aromatics | 1.0 | 0.9 |
| $C_8$ aromatics | 4.2 | 2.7 |
| $C_9$ aromatics | 4.6 | 2.3 |
| $C_{10}$ aromatics | 3.3 | 1.7 |
| $C_2= - C_5=$ | 44.9 | 72.0 |
| Aromatics | 13.3 | 7.8 |

What is claimed is:

1. A process for converting a feedstock comprising alcohol, carbonyl, ether or mixtures thereof to conversion product comprising hydrocarbon compounds which comprises contacting said feedstock at conversion conditions sufficient to convert said feedstock to said product with a catalyst composition prepared by a method which comprises forming a composite of a crystalline zeolite having a silica:alumina mole ratio of at least 100:1 and a Constraint Index from 1 to 12, a binder comprising alumina, and water, and contacting the composite with steam to enhance the activity of the catalyst.

2. The process of claim 1 in which the zeolite has a silica:alumina ratio of at least about 250:1.

3. The process of claim 2 in which the zeolite has a silica:alumina ratio of at least 1200:1.

4. The process of claim 1 in which the zeolite has the structure of ZSM-5, ZSM-11, ZSM-12, ZSM-23, ZSM-35 or ZSM-38.

5. The process of claim 4 in which the zeolite has the structure of ZSM-5.

6. The process of claim 1 in which the zeolite is in the as-synthesized or in the hydrogen form and the composite is formed by mulling the zeolite and the binder together in the presence of water and forming catalyst particles by extruding the mulled wet mixture.

7. The process of claim 6 in which the zeolite has the structure of ZSM-5 having a silica:alumina ratio of at least about 250:1 and the binder is alumina.

8. The process of claim 7 in which the zeolite is in the hydrogen form during the contact with the steam or in a form which is at least partly converted to the hydrogen form by contact with the steam.

9. A process for converting a feedstock comprising alcohol, carbonyl, ether or mixtures thereof to conversion product comprising hydrocarbon compounds which comprises contacting said feedstock at conversion conditions sufficient to convert said feedstock to said product with a catalyst composition prepared by a method which comprises mixing a high-silica zeolite having a Constraint Index of 1 to 12 with a binder comprising alumina, and treating the mixture of zeolite and binder at elevated temperature under conditions effective to increase catalytic activity of said mixture.

10. The process of claim 9 wherein said binder is alumina, said mixture comprises from about 10 to about 90 weight percent of said alumina, and said conditions effective to increase activity include a temperature of at least about 400° C.

11. The process of claim 1 wherein said conversion conditions include a temperature of from about 275° C. to about 600° C., a pressure of from about 0.5 atmosphere to about 50 atmospheres and a liquid hourly space velocity of from about 0.5 $hr^{-1}$ to about 100 $hr^{-1}$.

12. The process of claim 9 wherein said conversion conditions include a temperature of from about 275° C. to about 600° C., a pressure of from about 0.5 atmosphere to about 50 atmospheres and a liquid hourly space velocity of from about 0.5 $hr^{-1}$ to about 100 $hr^{-1}$.

13. The process of claim 1 wherein said alcohol is methanol.

14. The process of claim 9 wherein said alcohol is methanol.

15. The process of claim 9 wherein said zeolite has the structure of ZSM-5, ZSM-11, ZSM-12, ZSM-23, ZSM-35 or ZSM-38.

16. The process of claim 15 wherein said zeolite has the structure of ZSM-5.

* * * * *